… … …

United States Patent [19]

Bollen et al.

[11] Patent Number: 5,493,750
[45] Date of Patent: Feb. 27, 1996

[54] BLADE ASSEMBLY FOR WIPING MOTOR VEHICLE WINDSCREENS

[75] Inventors: Lode Bollen, Hechtel-Eksel, Belgium; Walter Wagner, Bühlertal, Germany; Dirk Nys, Tielt-Winge; Jan Vanroy, Schaffen, both of Belgium

[73] Assignee: Robert Bosch GmbH, Stuttgart, Germany

[21] Appl. No.: 284,529

[22] PCT Filed: Feb. 3, 1993

[86] PCT No.: DE93/00088

§ 371 Date: Oct. 31, 1994

§ 102(e) Date: Oct. 31, 1994

[87] PCT Pub. No.: WO93/14958

PCT Pub. Date: Aug. 5, 1993

[30] Foreign Application Priority Data

Apr. 2, 1992 [DE] Germany ............................ 9201307 U

[51] Int. Cl.⁶ ....................................................... B60S 1/38
[52] U.S. Cl. ................... 15/250.452; 15/250.31; 15/250.44
[58] Field of Search ............................ 15/250.42, 250.36, 15/250.31, 250.40, 250.41, 250.37, 250.38, 250.39

[56] References Cited

U.S. PATENT DOCUMENTS

| | | | |
|---|---|---|---|
| 3,116,507 | 1/1964 | Scinta | 15/250.42 |
| 3,823,437 | 7/1974 | Hauke | 15/250.42 |
| 3,866,261 | 2/1975 | Stratton | 15/250.42 |
| 4,389,747 | 6/1983 | Riester | 15/250.42 |
| 4,993,103 | 2/1991 | Takahashi et al. | 15/250.42 |

FOREIGN PATENT DOCUMENTS

| | | | |
|---|---|---|---|
| 1655362 | 2/1973 | Germany | 15/250.42 |
| 2036547 | 7/1980 | United Kingdom | 15/250.42 |
| 2154863 | 9/1985 | United Kingdom . | |

*Primary Examiner*—Gary K. Graham
*Attorney, Agent, or Firm*—Michael J. Striker

[57] ABSTRACT

A wiper blade serves to wipe motor vehicle windows. The wiper blade has an elongated wiping strip contacting the window and a holder which grasps the longitudinal sides of the wiping strip by at least two claws arranged at clip-like frame parts and a securing member which is fixed in the vicinity of one end of the wiping strip crosses the claws with two arms extending roughly parallel to one another and engages behind the claws by securing means. A worn wiping strip may be removed and replaced in a simple manner in that the securing member has a base part which is U-shaped in cross section and can be slipped onto the end of the wiping strip so as to fit thereon accompanied by clamping, in that at least the arms of the securing member are made of a flexible plastic, and in that securing means having locking or catching means are provided at the free end portion of one arm, complementary locking means of the other arm being associated with the securing means.

11 Claims, 2 Drawing Sheets

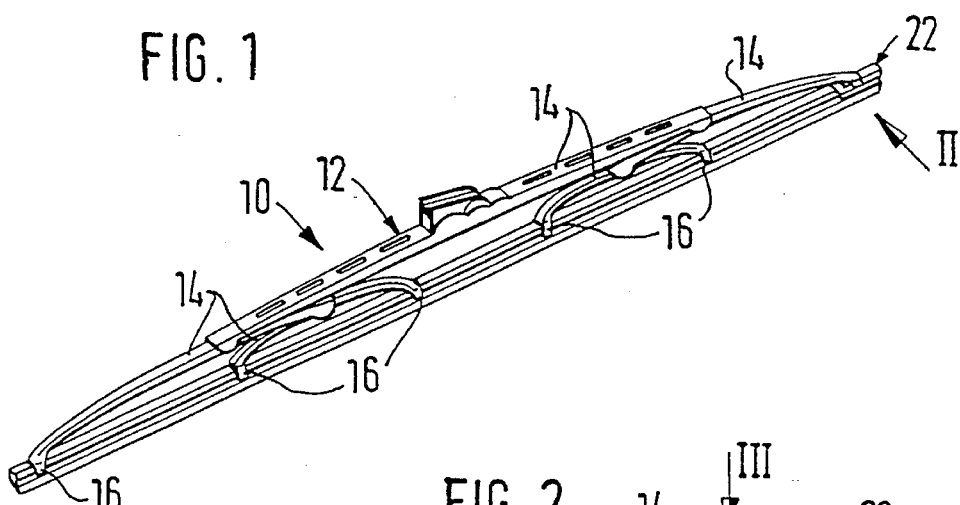
FIG. 1
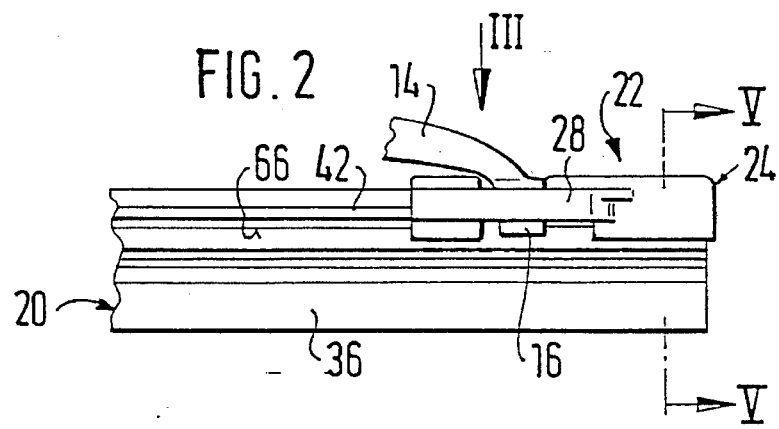
FIG. 2
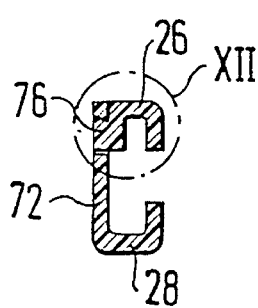
FIG. 11
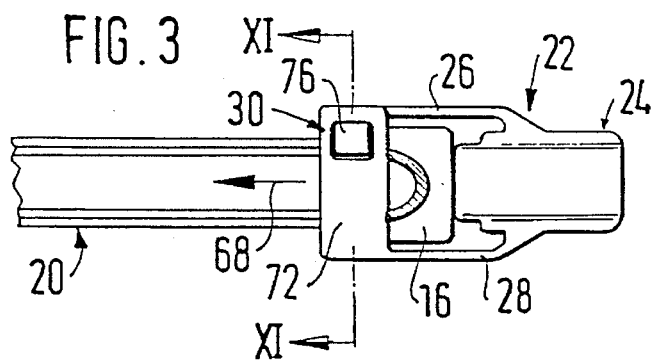
FIG. 3
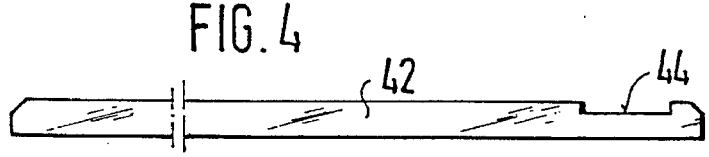
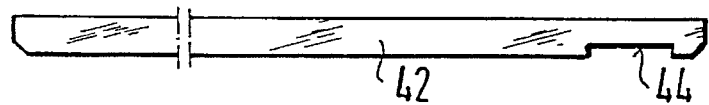
FIG. 4

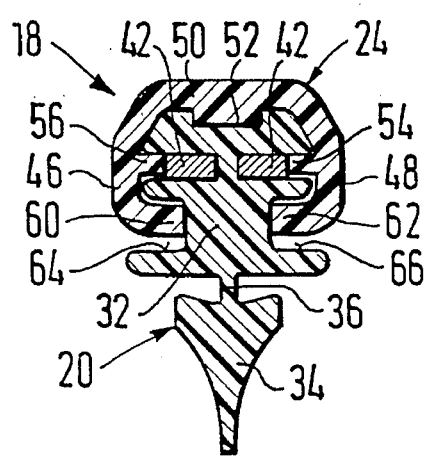
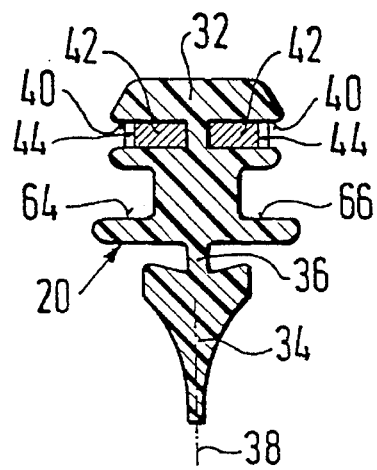
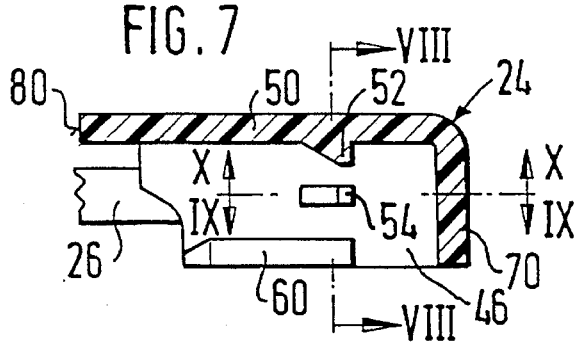
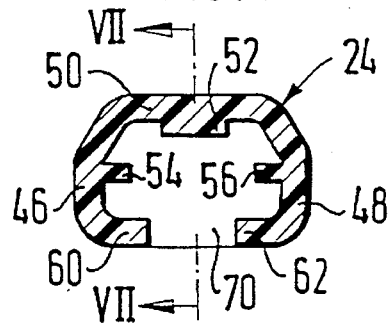
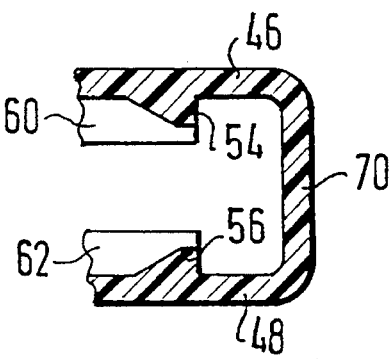
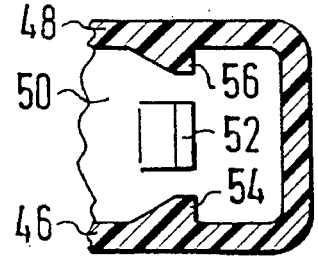
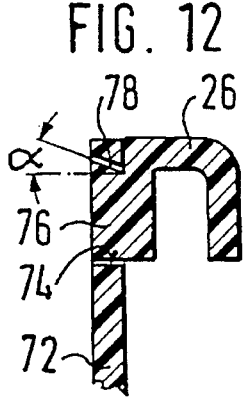

ns5,493,750

BLADE ASSEMBLY FOR WIPING MOTOR VEHICLE WINDSCREENS

PRIOR ART

The invention concerns a wiper blade. In a known wiper blade, as disclosed in German patent 21 54 863 A, during the insertion of the wiping strip into the claws of the holder, a securing element mounted on the wiper strip end engages with its elastically deflectable arms over the claws of the holder and the arms spring behind the claws. The arms arrestingly engage the claws with their arresting projections provided on their free ends and operating as securing means. Since the arms which must apply the whole arresting force are relatively short in a longitudinal direction, a great deviating angle under consideration of the arresting projections is provided. This arresting angle can be realized only with maintaining of very narrow tolerances both on the holder and on the claws as well as on the securing element, since otherwise there is a danger of breaking the arms. Also, the arms due to their available manufacturing stresses can spread, so that the locking is not sufficient or is not provided at all.

SUMMARY OF THE INVENTION

The wiper blade according to the invention with the characterizing features of the main claim has the advantage over the prior art that the base part can be clamped at the wiper blade in a self-locking manner resulting in a preassembled unit which can easily be connected with the holding clip frame as needed. Owing to the flexible arms of a safety element which is composed of a relatively soft synthetic plastic material, the securing means can easily be guided around the back of the claws then both arms are directly connected with one another by the securing means behind the holding frame or the claw by means of the locking and counterlocking means, so as to provide an especially secure mounting of the wiping strip on the holder. There is no need for special directions for assembling and operating the locking means, since their manner of operation may be understood by observation alone.

Advantageous further developments and improvements of the wiper blade indicated in the main claim are made possible by the steps indicated in the subclaims.

BRIEF DESCRIPTION OF THE DRAWINGS

An embodiment example of the invention is shown in the drawing and explained in more detail in the following description.

FIG. 1 shows a perspective view of a fully assembled wiper blade;

FIG. 2 shows an enlarged partial view of the end portion of a wiper blade as viewed in the direction of arrow II in FIG. 1;

FIG. 3 shows a partial section through the wiper blade according to FIG. 2 along line III—III;

FIG. 4 shows a partial view of two spring bars of the wiper blade;

FIG. 5 is an enlarged view showing a cross section through the wiper blade along line V—V in FIG. 2;

FIG. 6 shows a cross section according to FIG. 5 through a wiping strip of the wilder blade in which are installed the two spring bars according to FIG. 4;

FIG. 7 shows a partial longitudinal section along line VII—VII in FIG. 8 through a securing member belonging to the wiper blade;

FIG. 8 shows a cross section through the securing member according to FIG. 7 along line VIII—VIII;

FIG. 9 shows a partial section through the securing member according to FIG. 7 along line IX—IX;

FIG. 10 shows a partial section through the securing member according to FIG. 7 along line X—X;

FIG. 11 shows a section through the locked securing means along line XI—XI in FIG. 3;

FIG. 12 is an enlarged view of a detail XII in FIG. 11.

DESCRIPTION OF THE PREFERRED EMBODIMENT

At the present time, it is increasingly common to provide so-called refills for wiper blades of the type shown in FIG. 1. These refills are used to replace wiping strips which have been damaged through use. A refill has an elongated wiping strip and spring bars which are accommodated in the wiping strip as pressure distributing means and extend substantially along the entire length of the wiping strip. Further, such refills include at least one securing member which secures the wiping strip on a clip holder. In this way the wiping strip which is held by the claws of the holding clip frame is prevented from creeping out of these retaining claws in the longitudinal direction. Further, this securing member also often serves to lock the spring bars at the wiping strip. Often, it is very complicated to assemble the known refills, as has been established to the annoyance of the layman. This is due in part to the fact that such a refill has four loose components (wiping strip, two spring bars and a securing member) and the function of the securing member and position for installing the spring bar can only be found after extended trial attempts or by reading relatively extensive directions for assembly.

A wiper blade 10 shown in FIG. 1 has a holding clip frame 12 formed by a plurality of frame parts 14. The frame parts have retaining claws 16 through which a so-called refill 18 is guided. The refill 18 has the same kind of elongated shape as the holding clip frame 12. Each retaining claw 16 grips the longitudinal sides of a wiping strip which forms part of the refill 18. A securing member 22 of the refill serves to fix the refill 18 at the holding clip frame 12. The securing member 22 has a base part 24 from which two arms 26 and 28 extend substantially parallel to one another. The arms 26 and 28 cross and overlap the claw 16 of the holding clip frame 12, which claw 16 is located in the vicinity of one end of the wiping strip 20. Securing means 30 which engage behind this retaining claw 16 or behind the frame part 14 belonging to the retaining claw are arranged at the free ends of the arms 26 and 28. This arrangement is shown particularly in FIGS. 2 and 3. In the embodiment example, the securing member 22 is produced in its entirety from a flexible plastic, i.e. the arms 26 and 28 and the securing means 30 are connected with the base part 24 so as to form one piece.

As is illustrated in FIG. 6, the wiping strip 20 has a head strip 32 and an elongated wiper lip 34. The head strip and wiping strip are connected with one another via an elongated wobbling web 36. The wiping strip 20 has a uniform cross section along its entire length so that it can be manufactured advantageously by extrusion so as to provide an inexpensive refill. The wiping strip 20 is symmetrical in cross section corresponding to FIG. 6. Accordingly, with reference to an axis 38 of symmetry, two longitudinal grooves 40 which serve to receive spring bars 42 are arranged opposite one another in the head strip 32. As a result of these spring bars 42, the contact pressure acting on the wiper blade is uniformly distributed on the windshield to be wiped. The spring bars 42 are shown in FIG. 4. They are shown in their assembled position in FIG. 6. The spring bars 42 have cut out portions 44 which open toward the edge and are arranged at the outside of the spring bars 42 close to one end so as to lie opposite one another as viewed in the longitudinal direction. As is shown in particular by FIGS. 5 and 8, the base part 24 of the securing member 22 is substantially U-shaped in cross section. Thus, it has two sides or legs 46 and 48 and a wall 50 connecting the two legs of the U. A sawtooth-shaped, inwardly projecting clamping shoulder 52 is arranged at the wall 50 in such a way that the securing member 22 cannot disengage from its assembled position which will be described in the following.

Sawtooth-shaped retaining teeth 54 and 56 which engage in the cut out portions 44 of the spring bars 42 in preassembled refills (FIG. 5) are located at the two U-legs 46 and 48 of the base part 24 at the sides of the U-legs facing one another. A strip-like projection 60, 62 (FIG. 8) is arranged at the free U-legs 46, 48 of the base part 24 which is U-shaped in cross section. The strip-like projections 60 and 62 are directed toward one another and penetrate into channels 64, 66 of the head strip 32 when the securing member 22 is assembled, these channels 64, 66 being shaped like longitudinal grooves (FIG. 5). The arms 26 and 28 of the securing member 22 extend from the base part 24 of the securing member 22 in the slip-on direction (arrow 68, FIG. 3) of the securing member 22 when the latter is slipped onto the head strip 32 of the wiping strip 20. The head strip and base part are so dimensioned that the securing member 22 can be attached with the desired degree of clamping. In so doing, the retaining teeth 54 and 56 enter the cut out portions 44 of the spring bars 42 which are already inserted. Further, the clamping shoulder 52 penetrates into the head strip 32 of the wiping strip 20 which is made of a rubber-like material (FIG. 5). The securing member 22 is slid onto the head strip 32 until an end wall 70 which is located at the end of the base part 24 remote of the arms and connects the two U-legs 46 and 48 of the base part 24 abuts at the head strip 32.

The securing means 30 will be described more fully in the following. These securing means 30 include a transverse tab 72 at the free end of the arm 28, which transverse tab 72 extends to the other arm 26 when the securing member is assembled. This transverse tab 72 has an opening 74 which is shown as square in the embodiment example. The securing means also include a lateral step 76 at the other arm 26. This step 76 is constructed and adapted in such a way that it can engage in the opening 74. As is shown in FIG. 12, the opening 74 has, at its side remote of the arm 28, a wall region having an undercut which acts as a securing device and is constructed at an angle α. This undercut (angle α) is adapted to the shape of the side cheek region 78 of the step 76. This offers a degree of protection against an unintentional opening of the catch connection formed by the opening 74 and the step 76 of the two arms 26 and 28.

Accordingly, in the preassembled refill, the base part 24 of the securing member 22 holds the preassembled refill together since the securing member is held at the head strip of the wiping strip 20 at least via the clamping shoulder 52. The retaining teeth 56 and 54 secure the spring bars 42 by their cut out portions 44 so as to prevent an unintentional disengagement of the wiping strip 20. Thus, the user of the refill need only thread the preassembled refill through the claws 16 of the holding clip frame 12 until the base part 24 abuts at the claw of the frame part 14 by one of its end edges 80 (FIG. 7). It then guides the arms 26, 28 outwardly past the claw 16 and frame part 14 until the transverse tab 72 engages behind the claw 16 and frame part 14 as securing means (FIGS. 2 and 3). The step 76 then engages in the opening 74 of the transverse tab 72. In this way, the wiping strip 20 is adequately secured at the holding clip frame 12.

We claim:

1. A wiper blade for wiping windows of motor vehicles, the wiper blade comprising an elongated wiping strip for contacting a window and having longitudinal sides and two ends; a holding frame having frame parts connected thereto, said frame parts provided with claws for longitudinally, slidably receiving said strip, said claws grasp said longitudinal sides of said wiping strip; an elongated securing member for longitudinally fixing one end of said wiping strip with one of said frame parts, said securing member has two arms which overlap a claw of said one frame part and extend substantially parallel to one another, said securing member having securing means on said arms for engaging behind said claw of said one frame part, said securing member also having a base part from which said arms extend, said base part being U-shaped in transverse cross section and slippable onto an end of said wiping strip such that said base is secured with said wiping strip, at least said arms of said securing member being composed of a flexible plastic, said securing means including a first locking element provided at a free end of one of said arms and a complementary second locking element provided at a free end on the other of said arms and cooperating with said first locking element to lock said wiping strip at said one frame part, a locking connection is established between said first locking element and said complimentary second locking element such that said securing member surrounds said claw of said one frame part to secure said wiping strip with said one frame part.

2. A wiper blade as defined in claim 1, wherein said wiping strip is comprised of an elongated head strip, an elongated wiping lip, and a connecting member connecting said elongated wiping lip with said head strip, said head strip having two longitudinal grooves located opposite one another with reference to an axis of symmetry of said wiping; and said wiping strip further comprising elongated spring bars located in said longitudinal grooves, said spring bars having cutout portions therein which open away from one another at outer sides of said spring bars, said U-shaped base part of said securing member including legs with mutually facing sides which are provided with retaining teeth thereon engaging in said cutout portions.

3. A wiper blade as defined in claim 2, wherein said connecting member is formed as a web.

4. A wiper blade as defined in claim 2, wherein said connecting member is formed as a cross-piece.

5. A wiper blade as defined in claim 2, wherein said head strip has longitudinally extending channels formed therein in addition to said grooves, said legs having free ends provided with projections which face one another and engage in said channels of said head strip.

6. A wiper blade as defined in claim 1, wherein said U-shaped base part includes legs and a wall which connects said legs said wall has an inwardly projecting clamping shoulder.

7. A wiper blade as defined in claim 1, wherein said securing member is mountable in an a longitudinal direction defined by said strip, said arms extending from said base part in said longitudinal direction, said base part having legs and an end wall connecting said legs, said end wall provided at an end of said base part remote from said arms.

8. A wiper blade as defined in claim 1, wherein said first locking element includes a transverse web provided at said end of said one arm, said web having an opening therein, said complimentary second locking element being formed by a lateral step provided at said end of said other arm and fitting into said opening.

9. A wiper blade as defined in claim 8, wherein said opening at a side remote from said one arm has a wall region having an undercut forming part of said securing means.

10. A wiper blade as defined in claim 9, wherein said step has a side cheek region with a shape corresponding to a shape of said undercut.

11. A wiper blade as defined in claim 1, wherein said arms and securing means are formed of flexible plastic and are formed as a one piece structure.

* * * * *